United States Patent
Willner et al.

(10) Patent No.: US 7,319,806 B1
(45) Date of Patent: Jan. 15, 2008

(54) AUDIOVISUAL SYSTEM WHICH USES METADATA TO ALLOW USER-INITIATED JUMPS FROM POINT TO POINT WITHIN MULTIPLE AUDIOVISUAL STREAMS

(75) Inventors: Leopold B. Willner, Santa Cruz, CA (US); William P. Price, Fountain Valley, CA (US)

(73) Assignee: Keen Personal Media, Inc., Lake Forest, CA (US)

( * ) Notice: Subject to any disclaimer, the term of this patent is extended or adjusted under 35 U.S.C. 154(b) by 1229 days.

(21) Appl. No.: 09/877,632

(22) Filed: Jun. 8, 2001

(51) Int. Cl.
*H04N 5/79* (2006.01)

(52) U.S. Cl. .......................... 386/35; 386/46; 386/68; 725/41; 725/61; 725/151

(58) Field of Classification Search .......... 386/35, 386/46, 68; 725/41, 61, 151
See application file for complete search history.

(56) References Cited

U.S. PATENT DOCUMENTS

| | | | |
|---|---|---|---|
| 6,020,930 A | 2/2000 | Legrand | |
| 6,151,634 A | 11/2000 | Glaser et al. | |
| 6,154,600 A * | 11/2000 | Newman et al. | 386/52 |
| 6,240,241 B1 * | 5/2001 | Yuen | 386/95 |
| 6,868,225 B1 * | 3/2005 | Brown et al. | 386/83 |

OTHER PUBLICATIONS

Solution, Virage Inc. Brochure, pp. 1-8.
Powering Searchable Media, Pictron Brochure, 8 pages.
Video Application Server, Virage Inc. Datasheet, 2 pages.
VideoLogger, Virage Inc. Datasheet, 2 pages.
Face and On-Screen Text Recognition, Virage Inc. Datasheet, 2 pages.
Virage Applications Services, Virage Inc. Datasheet, 2 pages.
Sindication Manager, Virage Inc. Datasheet, 2 pages.

* cited by examiner

*Primary Examiner*—John Miller
*Assistant Examiner*—James A. Fletcher
(74) *Attorney, Agent, or Firm*—Knobbe, Martens, Olson & Bear

(57) ABSTRACT

An audiovisual system receives audiovisual data and includes a system controller and a storage device to store at least a portion of the audiovisual data for later playback. The audiovisual system further includes a marking module to create metadata in response to a control input for marking the program segments. The metadata includes the information regarding the program segments of the stored portion of the audiovisual data. The audiovisual system further includes a display generator to generate a mosaic representation of the program segments. The audiovisual system further includes a program selector to select a program segment in response to a user input. The selected program segment is selected based on the information of the metadata, whereby the audiovisual system selectively plays back selected program segments of the stored portion of the audiovisual data starting from selected program locations, thereby enabling a user to jump to and play back selected program segments.

27 Claims, 11 Drawing Sheets

Figure 9A:

|  | Prog. $P_1$ | Prog. $P_2$ | Prog. $P_3$ | Prog. $P_4$ |
|---|---|---|---|---|
| Segment $C_1$ | ◇ | ☺ | ☀ | Inn. 1A |
| Segment $C_2$ | △ | ◎ | ☾ | Inn. 1B |
| Segment $C_3$ | ⬖ | 🚫 | ⌒ | Inn. 2A |
|  | ⋮ | ⋮ | ⋮ | Inn. 2B |
|  | ⋮ | ⋮ | ⋮ | ⋮ |
|  | ⋮ | ⋮ | ⋮ | ⋮ |

FIGURE 9B:

|  | Prog. $P_1$ | Prog. $P_2$ | Prog. $P_3$ | Prog. $P_4$ |
|---|---|---|---|---|
| Segment $C_1$ | ◇ | ☺ | ☀ | Inn. 6A |
| Segment $C_2$ | △ | ◎ | ☾ | Inn. 6B |
| Segment $C_3$ | ⬖ | 🚫 | ⌒ | Inn. 7A |
|  | ⋮ | ⋮ | ⋮ | Inn. 7B |
|  | ⋮ | ⋮ | ⋮ | ⋮ |
|  | ⋮ | ⋮ | ⋮ | ⋮ |

FIGURE 9C:

| | Prog. $P_2$ | Prog. $P_3$ | Prog. $P_4$ | Prog. $P_5$ |
|---|---|---|---|---|
| Segment $C_1$ | ☺ | ☀ | Inn. 1A | I.1 |
| Segment $C_2$ | ◎ | ☾ | Inn. 1B | I.2 |
| Segment $C_3$ | 🚫 | ⌒ | Inn. 2A | I.3 |
| | ⋮ | ⋮ | Inn. 2B | I.4 |
| | ⋮ | ⋮ | ⋮ | ⋮ |
| | ⋮ | ⋮ | ⋮ | ⋮ |

FIGURE 9D:

| | Prog. $P_1$ | Prog. $P_2$ | Prog. $P_3$ | Prog. $P_{12}$ |
|---|---|---|---|---|
| Segment $C_1$ | ◇ | ☺ | ☀ | ♡ |
| Segment $C_2$ | △ | ◎ | ☾ | ⚡ |
| Segment $C_3$ | ⬖ | 🚫 | ⌒ | ☆ |
| | ⋮ | ⋮ | ⋮ | ⋮ |
| | ⋮ | ⋮ | ⋮ | ⋮ |
| | ⋮ | ⋮ | ⋮ | ⋮ |

AUDIOVISUAL SYSTEM WHICH USES METADATA TO ALLOW USER-INITIATED JUMPS FROM POINT TO POINT WITHIN MULTIPLE AUDIOVISUAL STREAMS

BACKGROUND OF THE INVENTION

1. Field of the Invention

The present invention is directed to audiovisual systems and methods for storing and playing back audiovisual data, and more specifically, to audiovisual systems and methods which provide information to the user to select stored audiovisual data for playback.

2. Description of the Related Art

Audiovisual systems, such as personal video recorders, provide users with the capability of storing audiovisual data in digital form on random-access, read/write, non-volatile storage media for later playback. As the number of programming channels available to users increases, and the storage capacity of such storage media increases, users will have heightened needs for assistance with selecting programs to watch and with managing the stored audiovisual data.

Various systems and methods have previously been developed to provide users with assistance in selecting which audiovisual data to store on the random-access storage media from the increasingly large amount of audiovisual programming available. For example, electronic program guide information can be displayed to the user in a variety of forms, thereby providing the user with information regarding the content of programs to be broadcast which can be the basis for selective storing of particular audiovisual programs. In addition, other systems can utilize preference determination modules which include algorithms to detect the viewing preferences of a user or multiple users. Such systems can initiate the storing of programs which satisfy the preference criteria of the user without requiring the user to search through the electronic program guide information.

While electronic program guide information and preference determination modules assist the user to select audiovisual programs for storing, there continues to be a need for assistance with regard to managing the increasingly large amount of audiovisual data stored by the audiovisual system. Many of the problems identified with the selection of audiovisual programs to be stored exist also with the selection of stored audiovisual programs to be played back. In addition, in existing systems, the information regarding the stored audiovisual programs and the user's selection of programs to be played back are not provided in an atavistic manner, thereby making the process of playback selection unduly onerous to the user.

SUMMARY OF THE INVENTION

One aspect of the present invention relates to an audiovisual system which receives audiovisual data and which stores for later playback at least a portion of the audiovisual data. The portion of the audiovisual data comprises a plurality of program locations, and each program location represents a starting point of a program segment of one of a plurality of programs. The audiovisual system is connectable to a user display. The audiovisual system comprises a system controller and a storage device to store the portion of the audiovisual data and to play back the stored portion of the audiovisual data. The audiovisual system further comprises a marking module coupled to the system controller to create metadata in response to a control input for marking the program segments. The metadata comprises the information regarding the program segments of the stored portion of the audiovisual data. The audiovisual system further comprises a display generator coupled to the system controller to generate a mosaic representation of the program segments of the stored portion of the audiovisual data. The audiovisual system further comprises a program selector coupled to the system controller to select a program segment of the stored portion of the audiovisual data in response to a user input. The selected program segment is selected based on the information of the metadata, whereby the audiovisual system selectively plays back selected program segments of the stored portion of the audiovisual data starting from selected program locations, thereby enabling a user to jump to and play back selected program segments of the plurality of programs.

Another aspect of the present invention relates to an audiovisual system which receives audiovisual data and which stores for later playback at least a portion of the audiovisual data. The portion of the audiovisual data comprises a plurality of program locations, and each program location represents a starting point of a program segment of one of a plurality of programs. The audiovisual system is connectable to a user display which provides to a user information regarding the program segments of the stored portion of the audiovisual data. The audiovisual system comprises a storage device to store the portion of the audiovisual data and to play back the stored portion of the audiovisual data. The audiovisual system further comprises a grid generator to configure for the user display the information regarding the program segments of the stored portion of the audiovisual data. The information is derived from metadata which corresponds to the program segments of the stored portion of the audiovisual data. The information is provided to the user via the user display in the format of a grid with a plurality of grid elements. Each grid element represents a program segment of the stored portion of the audiovisual data. The audiovisual system further comprises a program selector to select a grid element that represents a selected program segment of the stored portion of the audiovisual data in response to user input. The selected program segment is selected based on the information derived from the metadata, whereby the audiovisual system selectively plays back selected program segments of the stored portion of the audiovisual data starting from selected program locations, thereby enabling a user to jump to and play back selected program segments of the plurality of programs.

Yet another aspect of the present invention relates to a method of playing back selected portions of stored audiovisual data stored on a storage device. The method comprises providing stored audiovisual data corresponding to a plurality of programs. Each program comprises a plurality of program locations, each program location representing a starting point of a program segment of one of the plurality of programs. The method further comprises creating metadata in response to a control input for marking the program segments. The metadata comprises information regarding the program segments of the stored audiovisual data. The method further comprises displaying to a user the information regarding the program segments of the stored audiovisual data. The method further comprises receiving a user input indicating a selected program segment of one of the plurality of programs. The selected program segment is selected based on the information of the metadata. The method further comprises playing back the selected program segment starting from the corresponding program location of the stored audiovisual data, thereby jumping to and playing back selected program segments of the plurality of programs based on the metadata.

BRIEF DESCRIPTION OF THE DRAWINGS

FIGS. 9A-9D schematically illustrate a columnar display of program segments in accordance with an embodiment of the present invention.

DETAILED DESCRIPTION OF THE PREFERRED EMBODIMENT

In a world of hundreds of television channels and stored video provided by personal video recorders and home servers, rapid and convenient navigation among the available content and access to this content is a highly desirable and valuable capability. Embodiments of the present invention provide an application which will make the sequential viewing of short content within multiple lengthy videos effective and convenient. Such embodiments allow a user to quickly mark, locate, or view video segments from multiple videos using a graphical-user interface with a mosaic representation. The user can jump from point to point within the multiple videos to view and contrast scenes and content with ease and efficiency. As is explained more fully below, embodiments of the present invention create effective graphical-user interfaces and other means to make manifest an efficient and convenient way for a user to rapidly create and view video segments from numerous videos non-linearly using a mosaic environment of navigable starting images.

Figure 1:
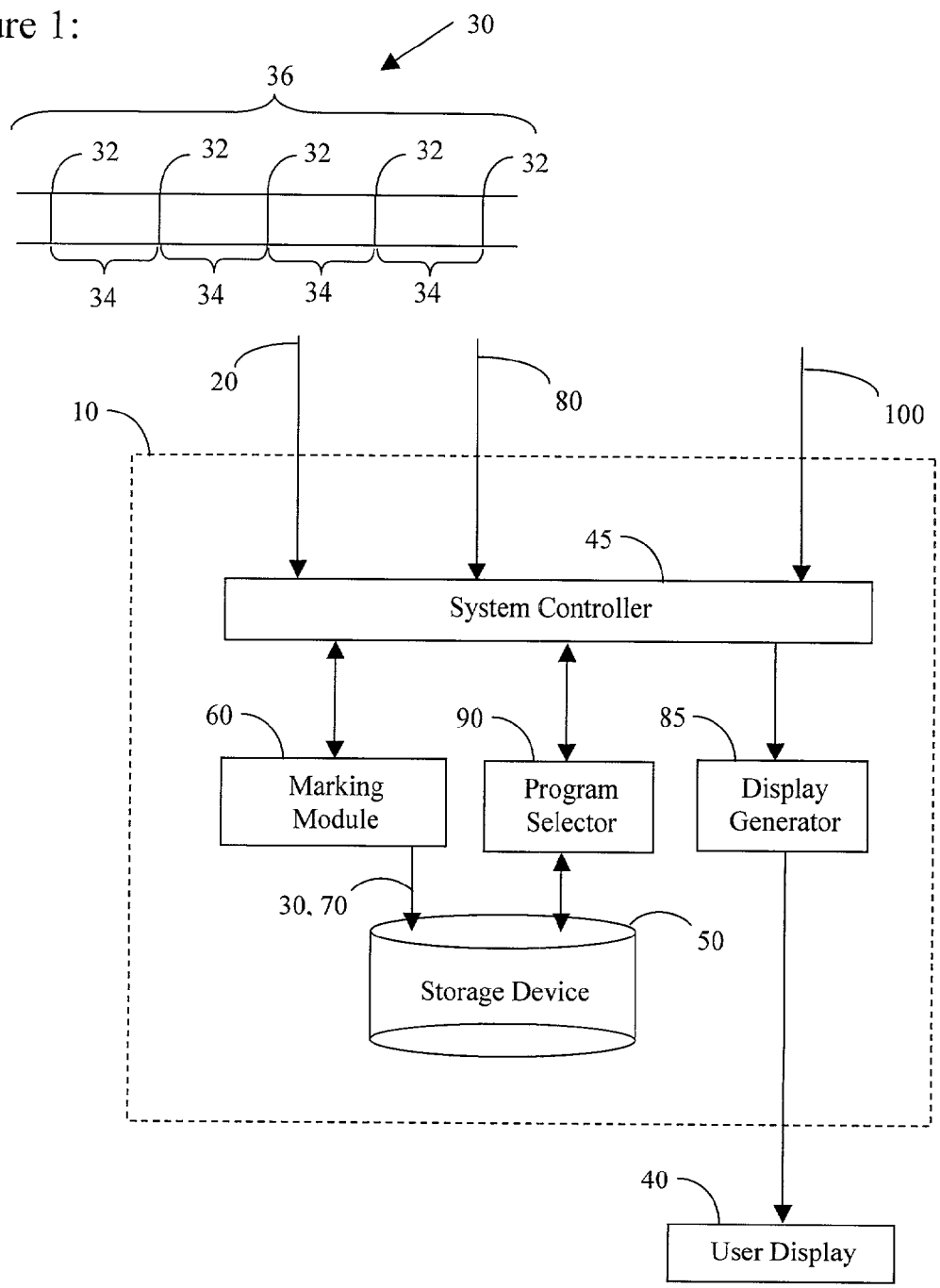
FIG. 1 schematically illustrates an audiovisual system in accordance with an embodiment of the present invention.

FIG. 1 schematically illustrates an audiovisual system 10 in accordance with an embodiment of the present invention. The audiovisual system 10 receives audiovisual data 20 and stores for later playback at least a portion 30 of the audiovisual data 20. The portion 30 of the audiovisual data 20 comprises a plurality of program locations 32, each program location 32 representing a starting point of a program segment 34 of one of a plurality of programs 36. The audiovisual system 10 is connectable to a user display 40. The audiovisual system 10 comprises a system controller 45 and a storage device 50 to store the portion 30 of the audiovisual data 20 and to play back the stored portion 30 of the audiovisual data 20. The audiovisual system 10 further comprises a marking module 60 coupled to the system controller 45 to create metadata 70 in response to a control input 80 for marking the program segments 34. The metadata 70 comprises the information regarding the program segments 34 of the stored portion 30 of the audiovisual data 20. The audiovisual system 10 further comprises a display generator 85 coupled to the system controller 45 to generate a mosaic representation of the program segments 34 of the stored portion 30 of the audiovisual data 20. The audiovisual system 10 further comprises a program selector 90 coupled to the system controller 45 to select a program segment 34 of the stored portion 30 of the audiovisual data 20 in response to a user input 100. The selected program segment 34 is selected based on the information of the metadata 70, whereby the audiovisual system 10 selectively plays back selected program segments 34 of the stored portion 30 of the audiovisual data 20 starting from selected program locations 32, thereby enabling a user to jump to and play back selected program segments 34 of the plurality of programs 36.

Various audiovisual systems 10 are compatible with embodiments of the present invention. Examples of such audiovisual systems 10 have previously been described in pending U.S. patent application Ser. No. 09/560,722, entitled "Video Recording System Utilizing External Video Storage To Record Streaming Video Data Via An Isochronous Interface," pending U.S. patent application Ser. No. 09/585,249, entitled "Digital Video Recorder Connectable To An Auxiliary Interface Of A Set-Top Box That Provides Video Data Stream To A Display Device Based On Selection Between Recorded Video Signal Received From The Digital Video Recorder And A Real-Time Video Signal," pending U.S. patent application Ser. No. 09/628,583, entitled "Video Recording System Utilizing Host-Processor-Resident Error Recovery To Transfer Non-Time-Critical, Error-Intolerant Data Segments While Transferring Time-Critical, Error-Tolerant Streaming Data Segments At A Required Data Transfer Rate," pending U.S. patent application Ser. No. 09/652,995, entitled "Video Recording System Utilizing Storage Redundancy To Transfer Non-Time-Critical, Error-Intolerant Data Segments While Transferring Time-Critical, Error-Tolerant Streaming Data Segments At A Required Data Transfer Rate," and pending U.S. patent application Ser. No. 09/652,730, entitled "Electronic Program Guide Subsystem For Receiving And Processing Electronic Program Guide Information From A Set-Top Box." Various embodiments of the audiovisual system 10 comprise a personal video recorder. Persons skilled in the art recognize that other embodiments of audiovisual systems 10 are compatible with the present invention.

In certain embodiments, the audiovisual data 20 received by the audiovisual system 10 is received from an audiovisual data service provider that supplies video programming to multiple users. Examples of such audiovisual data service providers include, but are not limited to, cable television systems and satellite systems. Alternatively, the audiovisual data 20 can be received from UHF or VHF broadcast signals using an antenna. Furthermore, the audiovisual data 20 can correspond to home video programs which the user produces and wants to upload to the audiovisual system 10. The terms "audiovisual" and "video," as used herein to describe the data and other features relevant to the present invention, are defined to encompass both the audio and video data which comprise the broadcast and recorded programs.

Figure 2:
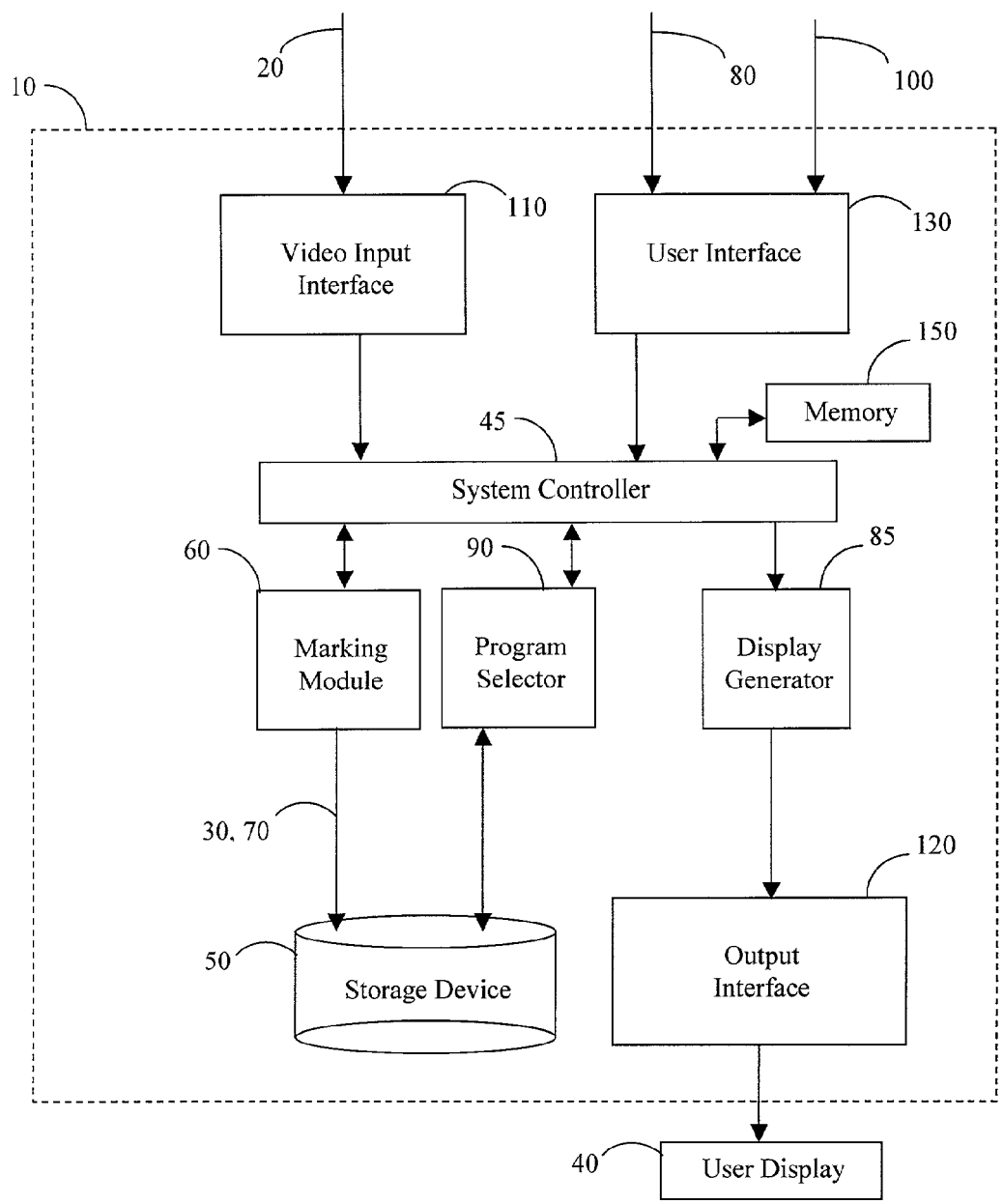
FIG. 2 schematically illustrates an audiovisual system in accordance with another embodiment of the present invention.

Audiovisual data 20 compatible with the present invention can be analog-formatted or digital-formatted, and can be encoded and/or encrypted. In certain embodiments, as schematically illustrated in FIG. 2, the audiovisual data 20 is received by a video input interface 110 of the audiovisual system 10. The video input interface 110 is configured to respond to the audiovisual data 20 by generating data segments with a format which is compatible with the other components of the audiovisual system 10. As the term is used herein, "audiovisual data" is defined to include the data which is received by the video input interface 110, as well as the data segments generated by the video input interface 110 and transmitted to other components of the audiovisual system 110. In certain embodiments, the video input interface 110 transmits to other components of the audiovisual system 10 only those portions 30 of the audiovisual data 20 which are selected for storing. Alternatively, in other embodiments, the video input interface 110 transmits audiovisual data to an output interface 120 coupled to a user display 40 so the user can view programs as they are being broadcast.

To provide compatibility of the audiovisual system 10 with analog-formatted audiovisual data 20, the video input interface 110 of one embodiment comprises an MPEG (Motion Pictures Experts Group) encoder, which generates compressed digitally-formatted data segments in response to the analog-formatted audiovisual data 20. Furthermore, for particular embodiments that are compatible with encrypted audiovisual data 20 (e.g., audiovisual data 20 from premium cable channels), the video input interface 110 comprises a decrypter. Alternatively, in other embodiments, the encoding and decrypting features described above may instead be performed by the system controller 45, or by some other component of the audiovisual system 10. Persons skilled in the art are able to provide a video input interface 110 that receives and appropriately responds to the audiovisual data 20 in a manner in accordance with the present invention.

The audiovisual data 20 is conceptually separable into a plurality of programs 36 among the various broadcast channels. In certain embodiments, these programs 36 can be individual movies, entertainment programs, information programs, sporting events, or any other broadcasts. Each program 36 is conceptually separable into a plurality of program segments 34, each with a program location 32 which represents a starting point of the program segment 34. For example, a program 36 comprising a broadcasted baseball game comprises program segments 34 corresponding to the half-inning portions of the baseball game, with each half-inning having a starting point or program location 32 corresponding to the moment when the first batter of that half-inning approaches home plate. Similarly, the program locations 32 can correspond to the beginnings of individual scenes in a movie or program. More generally, each program 36 has a very large number of program locations 32, with each program location 32 representing the starting point of the program segments 34 which follow the program location 32. The portion 30 of the audiovisual data 20 selected for storing then comprises a plurality of program locations 32 from the audiovisual data 20, with each program location representing a starting point of a program segment 34 of one of a plurality of programs 36 from the audiovisual data 20.

As described more fully below, in certain embodiments, the audiovisual data 20 can also comprise metadata 70 which comprises information regarding the program segments 34 of the audiovisual data 20. In such embodiments, the video input interface 110 is configured to receive the metadata 70 and transmit the metadata 70 to the system controller 45 and other appropriate components of the audiovisual system 10.

In the embodiment illustrated in FIG. 2, the selection of the portions 30 of the audiovisual data 20 for storing is communicated to the audiovisual system 10 by a user by sending appropriate signals to the system controller 45 via a user interface 130. Besides permitting the user to indicate which video program segments are selected from the audiovisual data 20 for storing, the user interface 130 allows the user to control other operation parameters of the audiovisual system 10, such as playback commands. As is described more fully below, in certain embodiments, the user interface 130 is also used to communicate other parameters to the system controller 45, such as the identity of the user, which can be used by the audiovisual system 10 to create metadata.

Various embodiments of the audiovisual system 10 include user interfaces 130 based on a variety of technologies. For example, the user interface 130 can comprise a remote control keypad device, or a keypad wired directly to the audiovisual system 10. Alternatively, a pointing device, such as a mouse, trackball, joystick, stylus, or laser pointer, may be used in conjunction with a displayed graphical-user interface image on the user display 40 to permit the user to communicate selections and other parameters to the audiovisual system 10. Other technologies which can provide more atavistic or ergonomic user interfaces 130 include voice recognition systems, eye movement response systems, or transducers responsive to brain waves. Persons skilled in the art are able to select an appropriate communication technology for the user interface 130 in accordance with the present invention.

Figure 3:
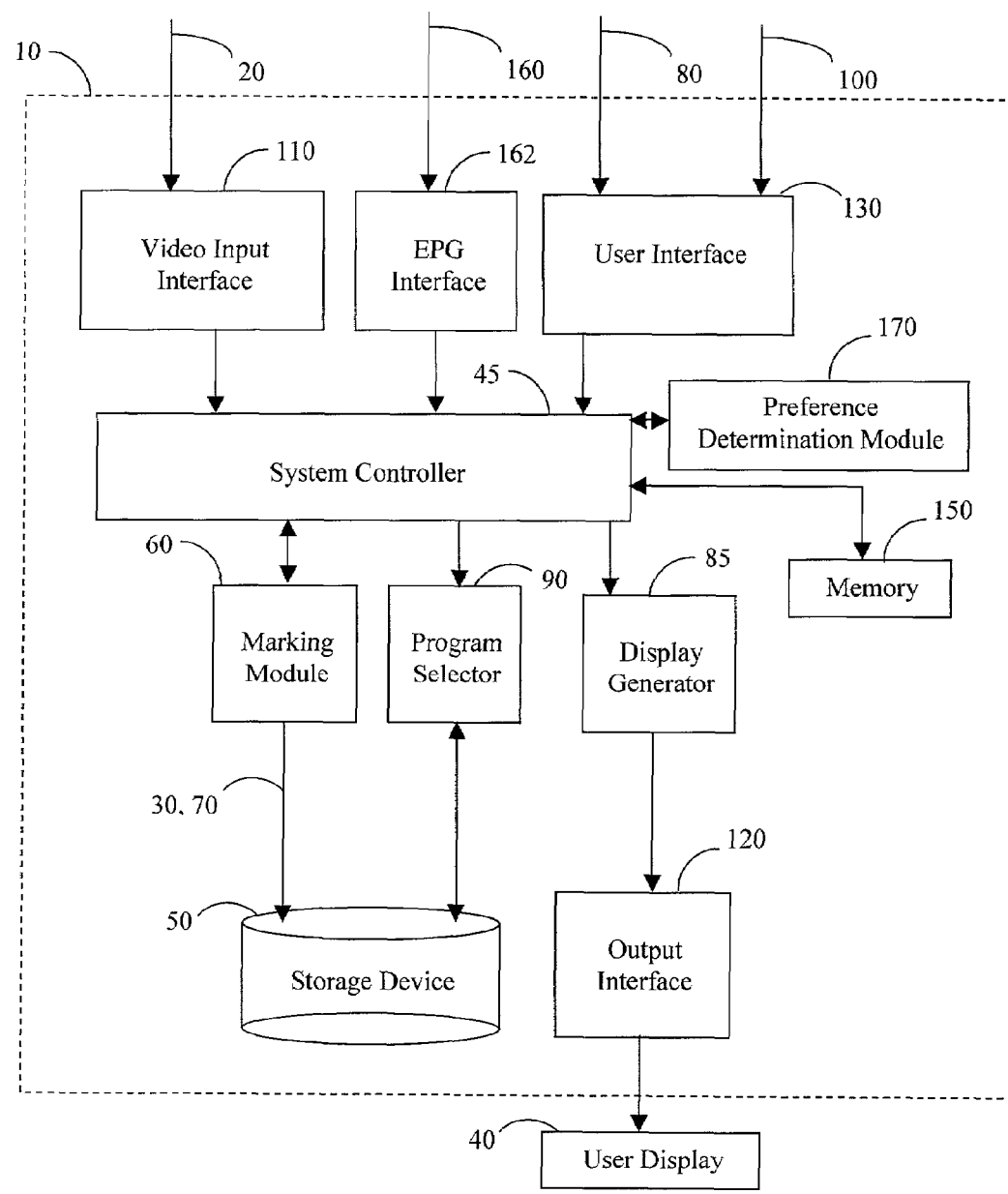
FIG. 3 schematically illustrates an audiovisual system in accordance with another embodiment of the present invention.

In alternative embodiments, the selection of the portions 30 of the audiovisual data 20 for storing can also be in response to electronic program guide (EPG) information 160 received by the system controller 45, as shown schematically in FIG. 3. In certain embodiments, the EPG information 160 is a database containing information regarding the current and future broadcast schedules for various video program segments from various broadcast channels. This EPG information 160 can include information regarding a video program segment, examples of which include, but are not limited to, the time and date of broadcast, channel, title, category (e.g., genre) of the program, principal actors, director, and brief synopsis. In one embodiment, the EPG information 160 is communicated to the audiovisual system 10 as a signal accompanying the audiovisual data 20, received by the video input interface 110, and transmitted to the appropriate components of the audiovisual system 10. Alternatively, as schematically illustrated in FIG. 3, the EPG information 160 is generated by a separate source from that of the audiovisual data 20 and is received by the audiovisual system 10 via an EPG interface 162. Once the EPG information 160 is communicated to the user via the user display 40, the user can select the portions 30 of the audiovisual data 20 to be stored.

In still other embodiments, the selection of the portions 30 of the audiovisual data 20 to be stored can also be made in response to signals from a preference determination module 170. A preference determination module 170 is an algorithm, enabled in hardware, software, or both, which monitors a user's viewing patterns to create a user profile of the user's viewing preferences. In certain embodiments, the preference determination module 170 can be resident in the system controller 45. Based on the user profile and the EPG information 160 for the upcoming program schedule, the preference determination module 170 recommends particular television programs which the user may be interested in viewing. These recommendations assist users to select portions 30 of the audiovisual data 20 for storing by alerting them to upcoming programs of interest. In certain embodiments, the audiovisual system 10 can be configured to automatically store these programs without further input from the user. In such embodiments, it is especially important to clearly communicate to the user which program segments 34 are available as stored program segments 34 since a subset of the stored program segments 34 will have been stored without user intervention. The parameters used by the preference determination module 170 for selecting portions 30 of the audiovisual data 20 can be displayed to the user via a graphical user interface image on a user display 40. An example of a preference determination module 170 compatible with the present invention is MbTV™ sold by Metabyte Networks, Inc. of Fremont, Calif.

In certain embodiments, the audiovisual system 10 comprises an output interface 120 coupled to the display generator 85 and connectable to a user display 40, which in certain embodiments of the present invention is a television. In response to signals from the display generator 85, the output interface 120 generates audiovisual data that is compatible with the user display 40. In this way, the audiovisual system 10 can display program segments and graphical-user interfaces with various information, such as EPG information 160, metadata 70, or other system information. Persons skilled in the art are able to select an appropriate configuration of the output interface 120 compatible with the present invention.

In certain embodiments, the system controller 45 is a chip or circuit configured to control the operation of the audiovisual system 10. In addition, the system controller 45 is responsive to the audiovisual data 20, the control input 80, and the user input 100. Persons skilled in the art can provide a system controller 45 in accordance with embodiments of the present invention.

The storage device 50 provides storage for storing audiovisual data segments and various system information. In certain embodiments of the present invention, the storage device 50 is compatible with a version of the ATA (AT-attachment) standard, such as IDE (Integrated Drive Electronics). In other embodiments, the storage device 50 is compatible with the SCSI (Small Computer System Interface) standard. In still other embodiments, the storage device 50 is compatible with the IEEE 1394 standard, which is described in the "IEEE Std 1394-1995 IEEE Standard for a High Performance Serial Bus," Aug. 30, 1996, which is incorporated by reference herein. Alternatively, the storage device 50 can be a writable digital video disk (DVD) drive, or another technology that comprises read/write, random-access, non-volatile storage media. In the embodiment schematically illustrated in FIG. 2, the storage device 50 stores the portion 30 of the audiovisual data 20 received from the video input interface 110 via a marking module 60 and plays back the stored portion 30 of the audiovisual data 20 to the output interface 120.

The marking module 60 creates metadata 70 in response to a control input 80 for marking the program segments 34. In the embodiment schematically illustrated in FIG. 2, the marking module 60 is coupled to the system controller 45 and the storage device 50. The control input 80 is communicated to the system controller 45, which transmits the control input 80 to the marking module 60. Alternatively in other embodiments, the marking module 60 is part of the system controller 45. The metadata 70 can be generated prior to or subsequently to the storing of the portion 30 of the audiovisual data 20 by the audiovisual system 10. The creation of metadata 70 can also comprise the modification, editing, or deletion of metadata 70 which was previously generated.

In embodiments in which the control input 80 is generated by the user, the control input 80 can be received by the user interface 130, as schematically illustrated in FIG. 2, and communicated to the marking module 60 via the system controller 45. In such embodiments, the user can provide information which can be annotated as metadata 70 by the marking module 60 with particular stored program segments 34. Examples of such information include, but are not limited to, indicators of the user's level of interest in the program segment 34, comments by the user regarding the program segment 34, and dates and events for which a stored home video was originally stored. In such embodiments, the information provided by the user can be used to index, annotate, or change existing metadata at indexing or marking points on a video. Annotation in the form of text, database fields, or other forms can be entered or edited by the user. As is explained more fully below, once a video is indexed and annotated, a storyboard of images can be assembled, and navigation software can allow a user to view the video segments in non-linear form.

Figure 4:
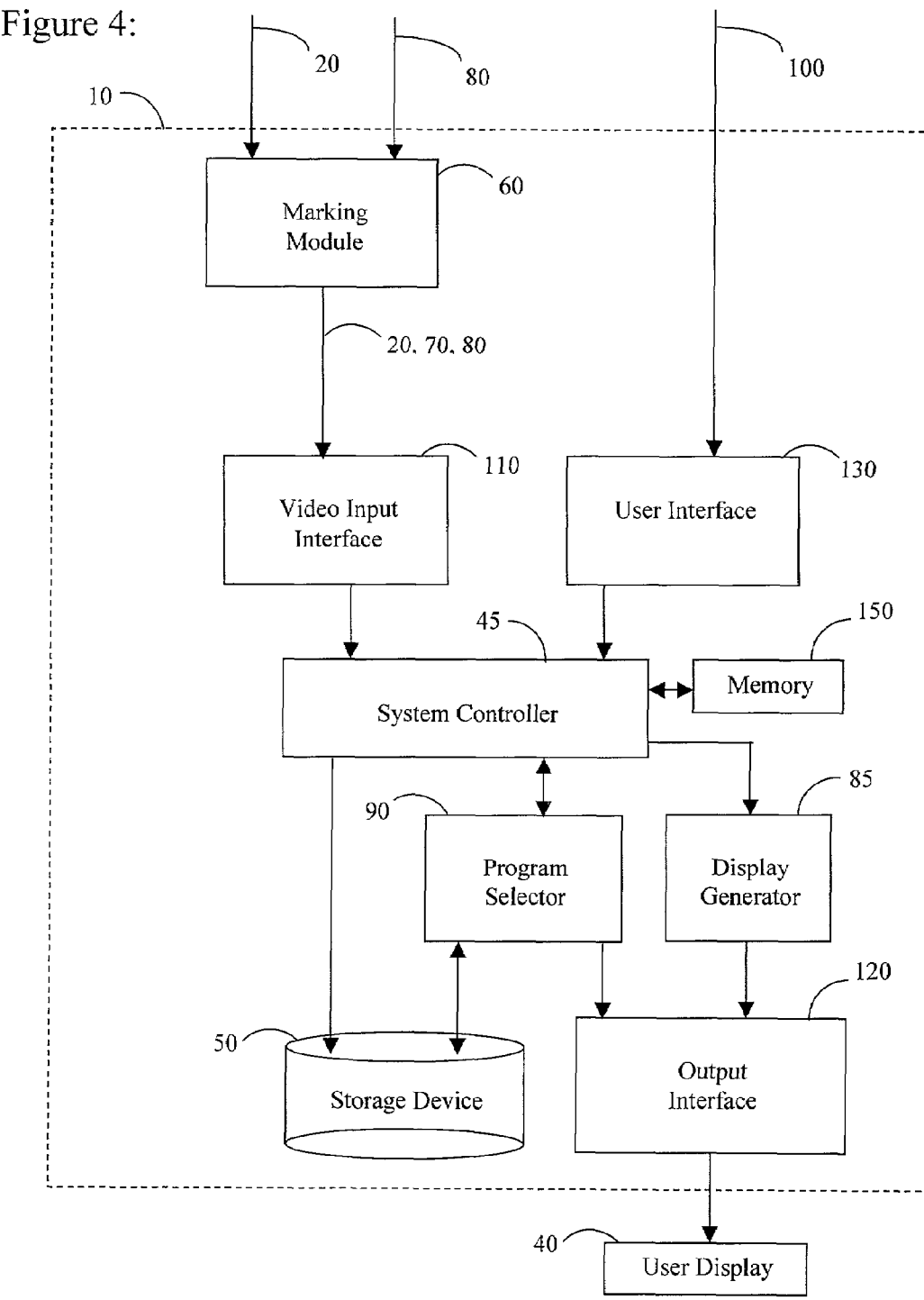
FIG. 4 schematically illustrates an audiovisual system in accordance with another embodiment of the present invention.

Alternatively in other embodiments, the control input 80 is not generated by the user. In one such embodiment, as schematically illustrated in FIG. 4, the marking module 60 and the source of the control input 80 are located upstream of the video input interface 110 such that the metadata 70 is created before the audiovisual data 20 is received by the video input interface 110. The metadata 70 can then be transmitted to the audiovisual system 10 along with the audiovisual data 20, and be transmitted to the system controller 45 by the video input interface 110. An example of such an embodiment includes, but is not limited to, a marking module 60 used by the audiovisual data service provider (e.g., CNN, NBC, etc.) to annotate the audiovisual data 20 before it is sent to the downstream users. In still other embodiments, a portion of the metadata 70 can be generated upstream of the input video interface 110 by a first marking module, and another portion of the metadata 70 can be generated by a second marking module after the audiovisual data 20 is received by the video input interface 110.

The metadata 70 used to mark the program segments 34 comprises information regarding the program segments 34 of the portion 30 of the audiovisual data 20 stored by the audiovisual system 10. Because the information contained in the metadata 70 is to be used to select which stored program segments 34 are to be played back for the user, the metadata 70 can include information which is similar to the information used to select which program segments 34 are to be stored. Such metadata 70 can contain information which includes, but is not limited to, the title of the program segment, category or genre of the program segment, names of the athletes, actors, or family members depicted in the program segment 34, and a brief synopsis of the program segment 34. In certain embodiments, such information is included in the metadata 70 by the marking module 60 in response to the control input 80 which includes EPG information.

In addition, the metadata 70 can be generated by the marking module 60 in response to the control input 80 which includes information from a preference determination module 170. In such embodiments, the metadata 70 can contain information which depends on the identity of the user, examples of which include, but are not limited to, the identity of the user for which the program segment 34 was stored or an indication of the parameters which were used to decide to record the program segment 34 for the user. Furthermore, the metadata 70 can include EPG information 160 upon which the preference determination module 170 generated its storing or viewing recommendations.

The metadata 70 can also be generated by the marking module 60 in response to the control input 80 which is generated from the program segment 34 itself. In certain such embodiments, the marking module 60 can include a recognition algorithm which analyzes the video and audio data to determine the existence of features conforming to previously identified user preferences. If such features are recognized, the marking module 60 generates appropriate metadata 70 and the program segment 34 is stored. Such recognition technologies for voice recognition, image recognition (including face recognition), text recognition, manual indexing, and scene change recognition (including identifying and marking the starting points of video clips) already exist and are in vogue. Examples of recognition technologies compatible with embodiments of the present invention include, but are not limited to, the "Media Gateway Suite" available from Pictron, Inc. of San Jose, Calif., and the "VideoLogger" system available from Virage, Inc. of San Mateo, Calif.

Other embodiments generate metadata 70 which comprises an image representation of the program segment 34. This image representation can be derived by the marking module 60 using a recognition algorithm, as described above. Examples of such image representations include, but are not limited to, an icon, a representative thumbnail still frame generated from the program segment 34, and a dynamic video image comprising a portion of the program segment 34.

Upon receiving the control input 80, the marking module 60 responds by creating metadata 70 which includes the information regarding the program segments 34 of the stored portion 30 of the audiovisual data 20. As schematically illustrated in FIG. 2, in certain embodiments, the marking module 60 transmits the program segments 34 from the portions 30 of the audiovisual data 20 to be stored to the storage device 50 and transmits the corresponding metadata 70 to the system controller 45. The system controller 45 can utilize a separate memory 150 to store the metadata 70 corresponding to the stored program segments 34. Alternatively in other embodiments, the metadata 70 can be stored on the storage device 50.

The display generator 85 is coupled to the system controller 45 to generate a mosaic representation of the program segments 34 of the stored portion 30 of the audiovisual data 20. As is explained more fully below, in certain embodiments, the display generator 85 can comprise a grid generator which produces a mosaic representation comprising a plurality of cells, with at least one cell comprising a fixed image. In alternative embodiments, the mosaic representation comprises a plurality of cells, with at least one cell comprising a video image.

The program selector 90 selects a program segment 34 of the stored portion 30 of the audiovisual data 20 in response to the user input 100. The selected program segment 34 is selected based on the information of the metadata 70. In the embodiment schematically illustrated in FIG. 2, the program selector 90 is coupled to the system controller 45, the output interface 120, and the storage device 50. The user input 100 is communicated to the system controller 45, which transmits the user input 100 to the program selector 90. Alternatively in other embodiments, the program selector 90 can be part of the system controller 45. As explained more fully below, in certain embodiments, the graphical display part of the program selector 90 is a standard graphical-user interface (GUI) responsive to the data in a database.

As is more fully described below, the audiovisual system 10 provides the user with information regarding the stored program segments 34 by displaying the information contained in the metadata 70 on the user display 40 in a mosaic format. In certain embodiments, the program selector 90 is responsive to the metadata 70 and to the user input 100 which indicates the user's selection criteria for stored program segments 34 to be played back. In one embodiment, the program selector 90 responds by selecting a subset of the stored program segments 34, the selection based on the user input 100 and the metadata 70. The program selector 90 then displays the information corresponding to the stored program segments 34 of this subset to the user on the user display 40. The user can then respond to the displayed information regarding the subset of stored program segments 34 to further narrow the criteria for selection, or to select a particular program segment 34 for playback.

Once the user generates and transmits the user input 100 indicating which particular stored program segment 34 is selected for playback based on the information of the metadata 70, the program selector 90 responds by selecting a stored program segment 34 for playback on the user display 40. In the embodiment schematically illustrated in FIG. 2, the program selector 90 communicates the selection to the storage device 50, and the storage device 50 responds by transmitting the selected stored program segment 34 starting at the corresponding selected program location 32 to the user display 40 via the program selector 90 and output interface 120. The user can provide the user input 100 at anytime, even while viewing another stored data segment 34, thereby interrupting the viewing of one program segment 34 to begin viewing another program segment 34. In this way, the audiovisual system 10 selectively plays back selected program segments 34 of the stored portion 30 of the audiovisual data 20 from selected program locations 32. The user is thereby able to jump to and play back selected program segments 34 of the plurality of programs 36. Persons skilled in the art are able to select an appropriate configuration of the program selector 90, storage device 50, and output interface 120 compatible with the present invention. For example, in certain embodiments, a user can be viewing a live telecast of the "Super Bowl," and can intersperse the live viewing with replays of key actions from prior "Super Bowls" so as to contrast and compare what is occurring in the live telecast with earlier games. Such a utility represents a major advance in time savings, convenience, and enjoyment.

Figure 5:
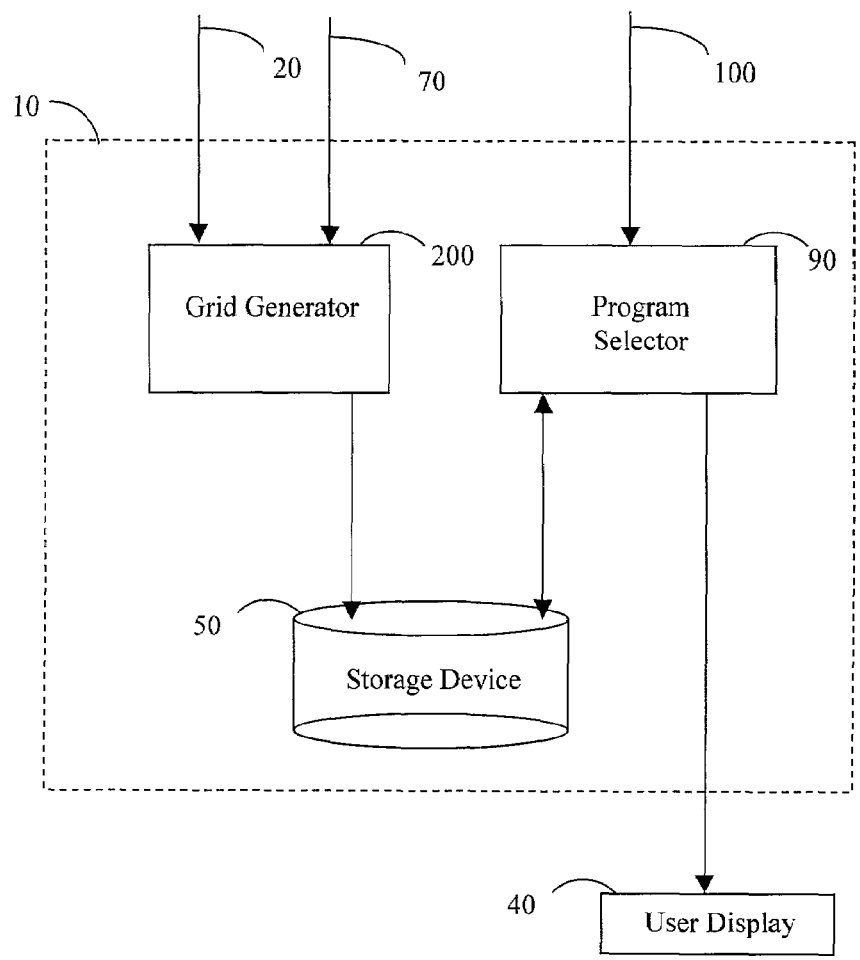
FIG. 5 schematically illustrates an audiovisual system in accordance with another embodiment of the present invention.

FIG. 5 schematically illustrates an audiovisual system 10 in accordance with an embodiment of the present invention. The audiovisual system 10 receives audiovisual data 20 and stores for later playback at least a portion 30 of the audiovisual data 20. The portion 30 of the audiovisual data 20 comprises a plurality of program locations 32, each program location 32 representing a starting point of a program segment 34 of one of a plurality of programs 36. The audiovisual system 10 is connectable to a user display 40 which provides to a user information regarding the program segments 34 of the stored portion 30 of the audiovisual data 20. The audiovisual system 10 comprises a storage device 50 to store the portion 30 of the audiovisual data 20 and to play back the stored portion 30 of the audiovisual data 20. The audiovisual system 10 further comprises a grid generator 200 to configure for the user display 40 the information regarding the program segments 34 of the stored portion 30 of the audiovisual data 20. The information is derived from metadata 70 which corresponds to the program segments 34 of the stored portion 30 of the audiovisual data 20. The information is provided to the user via the user display 40 in the format of a grid 210 with a plurality of grid elements 220. Each grid element 220 represents a program segment 34 of the stored portion 30 of the audiovisual data 20. The audiovisual system 10 further comprises a program selector 90 to select a grid element 220 that represents a selected program segment 34 of the stored portion 30 of the audiovisual data 20 in response to user input 100. The selected program segment 34 is selected based on the information derived from the metadata 70, whereby the audiovisual system 10 selectively plays back selected program segments 34 of the stored portion 30 of the audiovisual data 20 starting from selected program locations 32, thereby enabling a user to jump to and play back selected program segments 34 of the plurality of programs 36.

Figure 6:
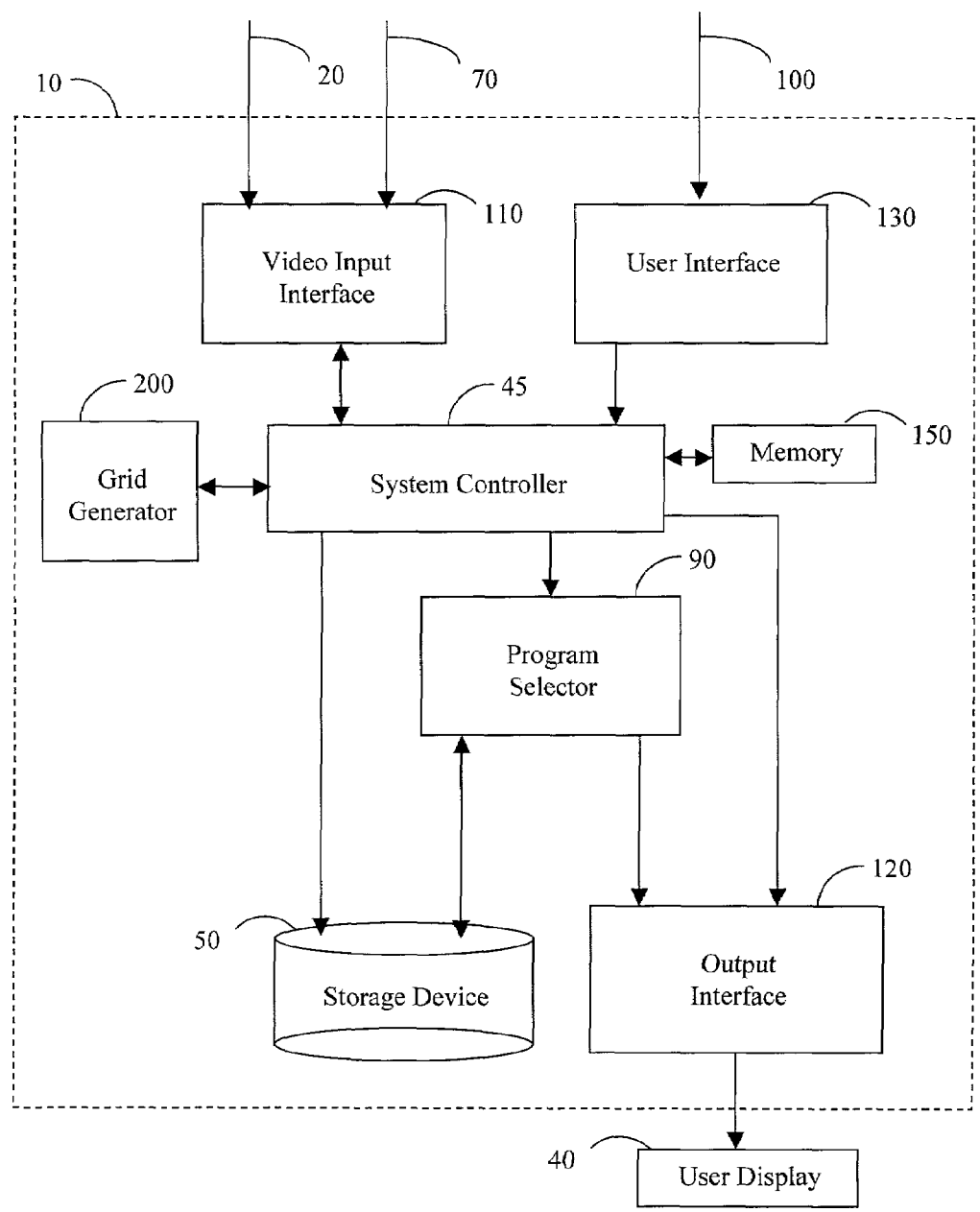
FIG. 6 schematically illustrates an audiovisual system in accordance with another embodiment of the present invention.

In the embodiment schematically illustrated in FIG. 6, the grid generator 200 is coupled to the system controller 45. Alternatively, in other embodiments, the grid generator 200 can be part of the system controller 45, or part of the program selector 90, or part of another component of the audiovisual system 10. Furthermore, the grid generator 200 of other embodiments can be coupled between the system controller 45 and the program selector 90, or between the system controller 45 and the output interface 120. Persons skilled in the art are able to configure the grid generator 200 in accordance with an embodiment of the present invention.

Figure 7:
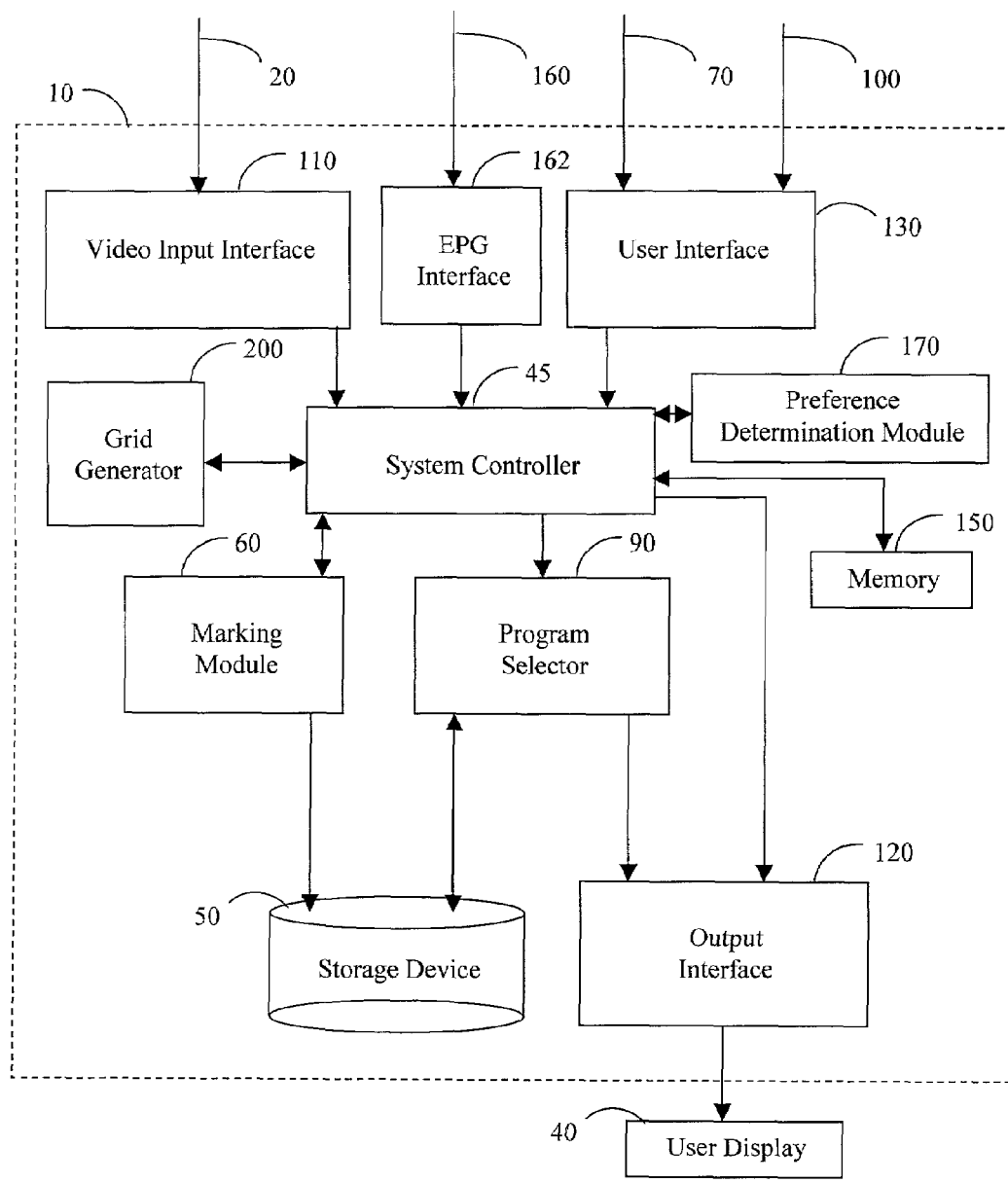
FIG. 7 schematically illustrates an audiovisual system in accordance with another embodiment of the present invention.

In the embodiment schematically illustrated in FIG. 7, the audiovisual system 10 includes both the marking module 60 and the grid generator 200, as well as an EPG interface 162 and a preference determination module 170. In such embodiments, metadata 70 can be created in response to a control input 80, and the corresponding information regarding the program segments 34 of the stored portion 30 of the audiovisual data 20 can be configured for the user display 40.

Figure 8:
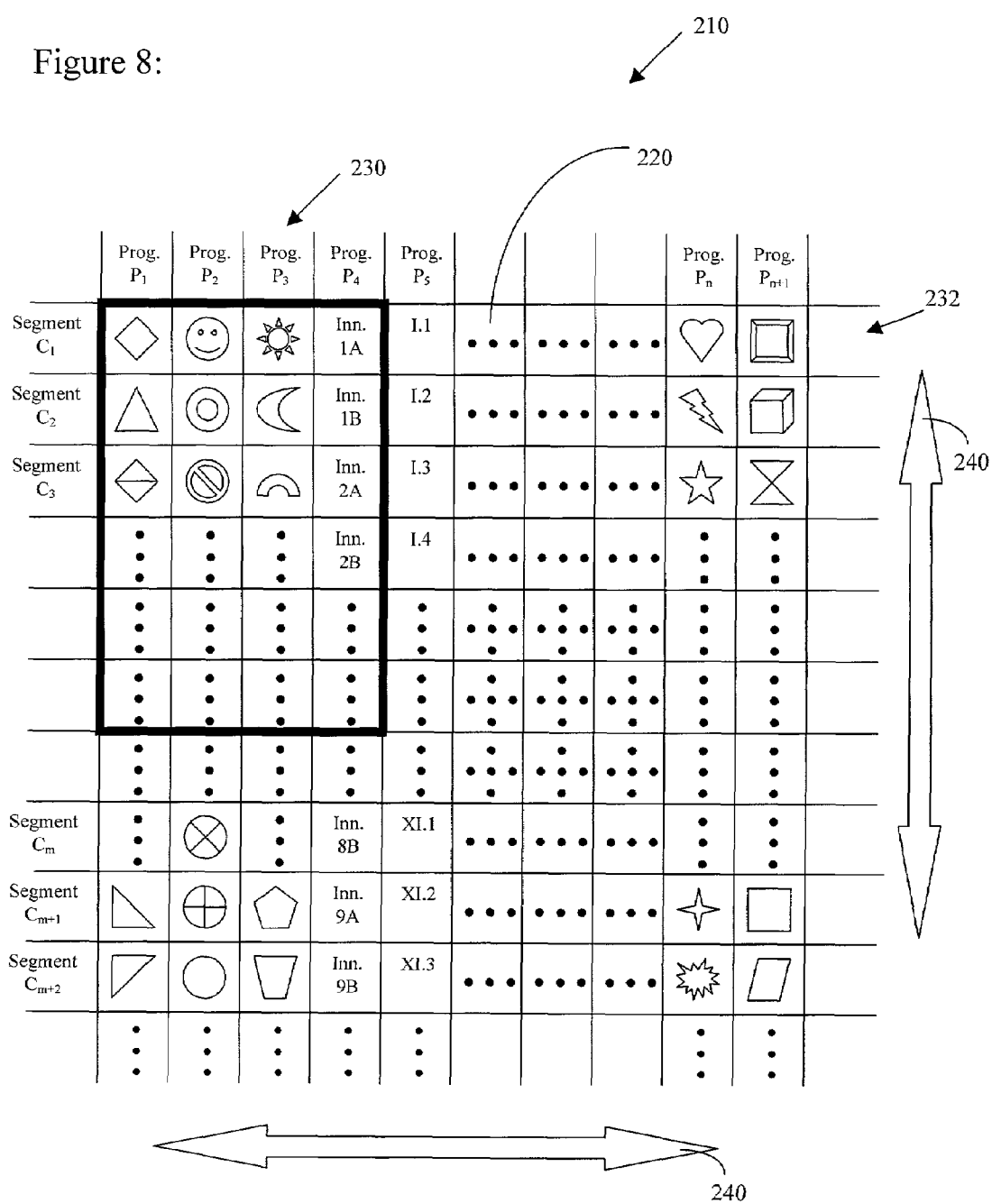
FIG. 8 schematically illustrates a grid in accordance with an embodiment of the present invention.

The grid generator 200 configures the information contained in the metadata 70 corresponding to the stored program segments 34 for display on the user display 40. In one embodiment, the grid generator 200 receives the metadata 70 from the system controller 45 and, in response, configures the information of the metadata 70 in the form of a grid 210, as schematically illustrated in FIG. 8. The grid 210 is presented to the user via the user display 40 which displays the grid 210 as part of a graphical-user-interface. As explained more fully below, in certain embodiments, the grid 210 is a mosaic representation of static or dynamic images that displays storyboards of starting images from multiple videos. The technology to create such grids 210 compatible with embodiments of the present invention currently exists and is in use by Canal+ of Paris, France, among others.

As schematically illustrated in FIG. 8, one embodiment of the grid 210 generated by the grid generator 200 contains a plurality of grid elements 220. Each grid element 220 represents a stored program segment 34 which is available for playback to the user. In the embodiment schematically illustrated in FIG. 8, the various stored programs 36 are configured as the columns 230 of the grid 210, and the various stored program segments 34 of each program 36 are configured as grid elements 220 of the columns 230. Each of the columns 230 is labeled with the title of the corresponding program 36. Similarly, each of the rows 232 can be labeled. Other embodiments can configure the grid 210 and grid elements 220 in different ways. Persons skilled in the art are able to configure the grid 210 and grid elements 220 in accordance with embodiments of the present invention.

In embodiments in which there are too many programs 36 and program segments 34 to be displayed together on the user display 40, the grid generator 200 can provide scrolling bars 240 to allow the user to display and access other programs 36 and program segments 34. In the embodiment schematically illustrated in FIG. 8, the dark border around a 4×6 grid element area represents the viewing area available on an exemplary user display 40. The grid 210 can be navigated in a columnar fashion, by which the user navigates the grid 210 based on selection and scrolling of columns which each correspond to a program.

For example, FIG. 9A schematically illustrates a user display consisting of programs $P_1$ to $P_4$, with each program represented by a column 230 of the grid 210. Each of the columns 230 can be scrolled individually to view the information corresponding to other program segments 34. As shown in FIG. 9B, the program $P_4$ can be scrolled to view the information related to later innings of the stored baseball game while not scrolling the other programs on the user display. As schematically illustrated in FIG. 9C, the viewing area can be scrolled to provide information on other columns 230 or programs. In FIG. 9C, the viewing area has been scrolled to provide information regarding programs $P_2$, $P_3$, $P_4$, and $P_5$. In addition, as schematically illustrated in FIG. 9D, columns can be substituted for one another in the viewing area. Persons skilled in the art are able to provide other navigation schemes in accordance with embodiments of the present invention.

Each of the grid elements 220 can represent the corresponding stored program segment 34 in various ways. In certain embodiments, at least one grid element 220 can comprise a still image extracted from the program segment 34 represented by the grid element 220. For example, the grid element 220 corresponding to the $C_1$ program segment 34 of the $P_1$ program 36 can comprise a static thumbnail image extracted from the start of the $C_1$ program segment 34. Alternatively, a grid element 220 can comprise a dynamic video image, i.e., a looping portion of the corresponding program segment 34. In other embodiments, at least one grid element 220 can comprise an icon which is representative of the program segment 34 represented by the grid element 220. For example, the grid element 220 corresponding to the $C_2$ program segment 34 of the $P_n$ program 36 of FIG. 8 comprises an icon "lightening bolt," which can represent that the program segment 34 includes an action sequence. In certain other embodiments, at least one grid element 220 can comprise text which is representative of the program segment 34 represented by the grid element 220. For example, the grid element 220 corresponding to the $C_1$ program segment 34 of the $P_4$ program 36 of FIG. 8 comprises the text "Inn. 1A," which can indicate that the program segment 34 includes the first half-inning of a baseball game.

In certain embodiments, the plurality of grid elements 220 comprises grid elements 220 chosen for display based on the metadata 70 of the corresponding program segments 34 of the stored portion 30 of the audiovisual data 20. For example, the grid 210 can include only a subset of all of the stored programs 36 available for playback, e.g., only the programs 36 containing sporting events. Similarly, the grid 210 can include only certain program segments 34, e.g., program segments 34 which contain a specified actor. In these embodiments, the grid elements 220 can also be chosen for display based on a second user input which represents the desired categories of program segments 34 of interest. In this way, the user can instruct the grid generator 200 to display only the desired categories of program segments 34. In certain embodiments, these program segments 34 can be organized within the grid 210 format in response to the metadata 70, while in other embodiments, the grid generator 200 can organize the grid elements 220 of the grid 210 in response to a third user input. In still other embodiments, the plurality of grid elements 220 are organized within the grid 210 based on the program 36 from which each program segment 34 is derived, as schematically illustrated in FIG. 8. Persons skilled in the art are able to configure a grid generator 200 which can configure the grid 210 and grid elements 220 in accordance with embodiments of the present invention.

The program selector 90 selects a grid element 220 that represents a selected program segment 34 in response to user input 100. The selected program segment 34 is selected by the user based on the metadata 70 which is displayed on the user display 40. The user can then indicate his or her interest in any short content which can be only a portion of one or more videos. In certain embodiments, the program selector 90 provides a cursor which can be moved around the grid 210 in response to user input 100. By highlighting a particular grid element 220 with the cursor, the user can indicate which program segment 34 is selected for playback. Other embodiments can utilize other techniques for indicating the selected program segment 34. In this way, the audiovisual system 10 can selectively play back selected program segments 34 of the stored portion 30 of the audiovisual data 20 starting from selected program locations 32. The user is then able to jump to and play back selected program segments 34 of the plurality of programs 36. Persons skilled in the art are able to configure a program selector 90 in accordance with embodiments of the present invention.

Figure 10:
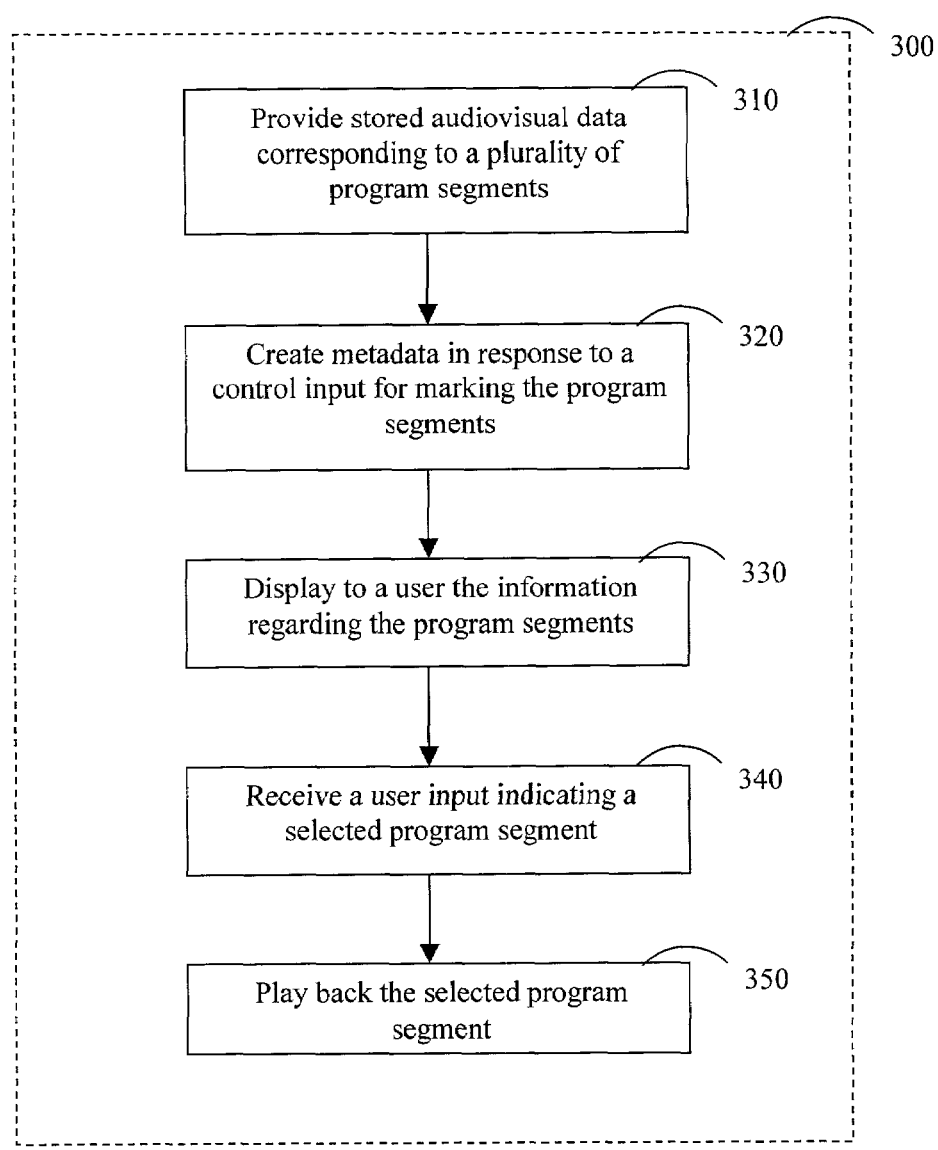
FIG. 10 schematically illustrates a method of playing back selected portions of stored audiovisual data stored on a storage device in accordance with an embodiment of the present invention.

FIG. 10 schematically illustrates a method 300 of playing back selected portions 30 of stored audiovisual data 20 stored on a storage device 50 in accordance with an embodiment of the present invention. The method 300 comprises an operational block 310 for providing stored audiovisual data 20 corresponding to a plurality of programs 36. Each program 36 comprises a plurality of program locations 32, each program location 32 representing a starting point of a program segment 34 of one of the plurality of programs 36. The method 300 further comprises an operational block 320 for creating metadata 70 in response to a control input 80 for marking the program segments 34. The metadata 70 comprises information regarding the program segments 34 of the stored audiovisual data 200. The method 300 further comprises an operational block 330 for displaying to a user the information regarding the program segments 34 of the stored portion 30 of the audiovisual data 20. The method 300 further comprises an operational block 340 for receiving a user input 100 indicating a selected program segment 34 of one of the plurality of programs 36. The selected program segment 34 is selected based on the information of the metadata 70. The method 300 further comprises an operational block 350 for playing back the selected program segment 34 starting from the corresponding program location 32 of the stored audiovisual data 20, thereby jumping to and playing back selected program segments 34 of the plurality of programs 36 based on the metadata 70.

In certain embodiments, in the operational block 310, the stored audiovisual data 20, which comprises stored program segments 34, are provided by the storage device 50 which had previously stored the audiovisual data. Such an embodiment was described above in reference to FIGS. 1 and 2.

In certain embodiments, creating the metadata 70 in response to the control input 80 in the operational block 320 is performed by a marking module 60 after the audiovisual data 20 is received by the video input interface 110. Such an embodiment was described above in reference to FIGS. 2 and 3. In certain other embodiments, creating the metadata 70 in response to the control input 80 in the operational block 320 comprises providing pre-existing metadata 70 from a marking module 60 upstream from the video input interface 110 and modifying the pre-existing metadata 70. Such an embodiment was described above in reference to FIG. 4. In still other embodiments, the metadata 70 is created in response to signals from a preference determination module, as was described above in reference to FIG. 3.

In certain embodiments, displaying the information regarding the stored program segments 34 to the user in the operational block 330 comprises displaying the information in a grid 210 format with a plurality of grid elements 220. Each grid element 220 represents a program segment 34 starting from a corresponding program location 32 of the stored audiovisual data 20. Such an embodiment was described above in reference to FIGS. 5, 6, and 7. In still other embodiments, an image is extracted from at least one program segment 34 and displayed in the grid element 220 corresponding to the program segment 34. Such an embodiment was described above in reference to FIG. 8 and FIGS. 9A-9D.

In certain embodiments, the user input 100 indicating the selected program segment 34 is received in the operational block 340 by a user interface 130 and transmitted to a program selector 90 via the system controller 45. Such an embodiment was described above in reference to FIG. 2.

In certain embodiments, the selected program segment 34 is played back in the operational block 350 by sending the selected program segment 34 to the user display 40 via the output interface 120. Such an embodiment was described above in reference to FIGS. 2, 3, and 4.

Certain embodiments of the present invention are accomplished via suitable software, which can be utilized by both a set-top box and a personal computer in a so-called "two-screen" configuration. In the "two-screen" configuration, the personal computer performs the processing-intensive marking functions and the set-top box provides the display functions. Alternatively, a "single-screen" configuration can be used in which all the capabilities of embodiments of the present invention reside with the set-top box alone.

What is claimed is:

1. An audiovisual system which receives audiovisual data and which stores for later playback at least a portion of the audiovisual data, the stored portion of the audiovisual data comprising a plurality of stored programs, each stored program comprising a plurality of program locations, each program location representing a starting point of a program segment of one of the plurality of stored programs, the audiovisual system connectable to a user display, the audiovisual system comprising:

a system controller;

a storage device to store the portion of the audiovisual data and to play back the stored portion of the audiovisual data;

a marking module coupled to the system controller to create metadata in response to a control input for marking the program segments, the metadata comprising information regarding the program segments of the stored portion of the audiovisual data;

a display generator coupled to the system controller to generate a mosaic representation of the program segments of the stored portion of the audiovisual data, wherein the mosaic representation comprises a plurality of cells representing a first plurality of respective stored program segments of a first stored program and a second plurality of respective stored program segments of a second stored program, the plurality of cells comprising images extracted from the respective stored program segments; and a program selector coupled to the system controller to select a program segment of the stored portion of the audiovisual data in response to a user input, the selected program segment selected based on the information of the metadata, whereby the audiovisual system selectively plays back selected program segments of the stored portion of the audiovisual data, thereby enabling a user to jump to and play back selected program segments of the plurality of programs.

2. The audiovisual system of claim 1, wherein the audiovisual system comprises a personal video recorder.

3. The audiovisual system of claim 1, wherein the storage device comprises a read/write, random-access, non-volatile storage media.

4. The audiovisual system of claim 1, wherein the metadata comprises user-generated modifications to pre-existing metadata.

5. The audiovisual system of claim 4, wherein the pre-existing metadata is received by the audiovisual system with the audiovisual data.

6. The audiovisual system of claim 1, wherein the metadata is created subsequently to the storing of the stored portion of the audiovisual data by the audiovisual system.

7. The audiovisual system of claim 1, further comprising a preference determination module, and wherein the control input comprises signals from the preference determination module.

8. The audiovisual system of claim 1, wherein the metadata comprises information indicating a level of interest by a user in the program segment starting from the corresponding program location.

9. The audiovisual system of claim 1, wherein the metadata comprises information indicating a category of the program segment starting from the corresponding program location.

10. The audiovisual system of claim 9, wherein the category comprises the genre of the program segment starting from the corresponding program location.

11. The audiovisual system of claim 1, wherein the metadata comprises information indicating an identity of a user.

12. The audiovisual system of claim 1, wherein at least one cell of the plurality of cells comprises a fixed image.

13. The audiovisual system of claim 1, wherein at least one cell of the plurality of cells comprises a video image.

14. An audiovisual system which receives audiovisual data and which stores for later playback at least a portion of the audiovisual data, the stored portion of the audiovisual data comprising a plurality of stored programs, each stored program comprising a plurality of program locations, each program location representing a starting point of a program segment of one of the plurality of stored programs, the audiovisual system connectable to a user display which provides to a user information regarding the program segments of the stored portion of the audiovisual data, the audiovisual system comprising:

a storage device to store the portion of the audiovisual data and to play back the stored portion of the audiovisual data;

a grid generator to configure for the user display the information regarding the program segments of the stored portion of the audiovisual data, the information derived from metadata corresponding to the program segments of the stored portion of the audiovisual data, the information provided to the user via the user display in grid format with a plurality of grid elements arranged as a plurality of rows and a plurality of columns, the plurality of grid elements representing a first plurality of respective program segments of a first stored program and a second plurality of respective program segments of a second stored program, each grid element independently selectable in response to a user input; and a program selector to select a grid element that represents a selected program segment of the stored portion of the audiovisual data in response to the user input, the selected program segment selected based on the information derived from the metadata, whereby the audiovisual system selectively plays back selected program segments of the stored portion of the audiovisual data, thereby enabling a user to jump to and play back selected program segments of the plurality of programs.

15. The audiovisual system of claim 14, wherein at least one grid element comprises an image extracted from the program segment represented by the grid element.

16. The audiovisual system of claim 14, wherein at least one grid element comprises an icon which is representative of the program segment represented by the grid element.

17. The audiovisual system of claim 14, wherein at least one grid element comprises text which is representative of the program segment represented by the grid element.

18. The audiovisual system of claim 14, wherein the plurality of grid elements comprises grid elements chosen for display based on the metadata of the corresponding program segments of the stored portion of the audiovisual data.

19. The audiovisual system of claim 14, wherein the plurality of grid elements comprises grid elements chosen for display based on a second user input.

20. The audiovisual system of claim 14, wherein the plurality of grid elements are organized within the grid format in response to the metadata.

21. The audiovisual system of claim 14, wherein the plurality of grid elements are organized within the grid format in response to a third user input.

22. The audiovisual system of claim 14, wherein the plurality of grid elements are organized within the grid format based on the program from which each program segment is derived.

23. A method of playing back selected portions of stored audiovisual data stored on a storage device, the method comprising:

providing stored audiovisual data corresponding to a plurality of programs, each program comprising a plurality of program locations, each program location representing a starting point of a program segment of one of the plurality of programs;

creating metadata in response to a control input for marking the program segments, the metadata comprising information regarding the program segments of the stored audiovisual data;

displaying to a user the information regarding the program segments of the stored audiovisual data in a mosaic representation, wherein the mosaic representation comprises a plurality of cells representing a first plurality of respective stored program segments of a first stored program and a second plurality of respective stored program segments of a second stored program, the plurality of cells comprising images extracted from the respective stored program segments;

receiving a user input indicating a selected program segment of one of the plurality of programs, the selected program segment selected based on the information of the metadata; and playing back the selected program segment of the stored audiovisual data, thereby jumping to and playing back selected program segments of the plurality of programs based on the metadata.

24. The method of claim 23, wherein creating metadata in response to the control input comprises providing pre-existing metadata and modifying the pre-existing metadata.

25. The method of claim 23, wherein creating metadata in response to the control input comprises creating metadata in response to signals from a preference determination module.

26. The method of claim 23, wherein at least one cell of the plurality of cells comprises a fixed image.

27. The method of claim 23, wherein at least one cell of the plurality of cells comprises a video image.

* * * * *